(12) United States Patent
Ishihara (10) Patent No.: US 8,319,851 B2
(45) Date of Patent: Nov. 27, 2012

(54) IMAGE CAPTURING APPARATUS, FACE AREA DETECTING METHOD AND PROGRAM RECORDING MEDIUM

(75) Inventor: Masanori Ishihara, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 367 days.

(21) Appl. No.: 12/617,891

(22) Filed: Nov. 13, 2009

(65) Prior Publication Data

US 2010/0149365 A1 Jun. 17, 2010

(30) Foreign Application Priority Data

Dec. 12, 2008 (JP) .................................. 2008-316602

(51) Int. Cl.
H04N 5/228 (2006.01)
(52) U.S. Cl. .................. 348/222.1; 348/333.11; 382/118
(58) Field of Classification Search ............... 348/222.1, 348/333.11; 382/118
See application file for complete search history.

(56) References Cited

U.S. PATENT DOCUMENTS

| | | | |
|---|---|---|---|
| 7,315,631 B1 | 1/2008 | Corcoran et al. | |
| 7,747,157 B2 | 6/2010 | Sugimoto | |
| 2007/0064145 A1* | 3/2007 | Sugimoto | 348/345 |
| 2008/0024624 A1* | 1/2008 | Okamoto | 348/229.1 |
| 2008/0050022 A1 | 2/2008 | Okada et al. | |
| 2008/0074529 A1* | 3/2008 | Terashima | 348/345 |
| 2008/0158407 A1 | 7/2008 | Funamoto | |
| 2008/0205870 A1* | 8/2008 | Ueda | 396/125 |
| 2008/0218595 A1* | 9/2008 | Kawahara | 348/222.1 |
| 2008/0284867 A1* | 11/2008 | Ishihara | 348/222.1 |

FOREIGN PATENT DOCUMENTS

| | | |
|---|---|---|
| EP | 1519560 A2 | 3/2005 |
| EP | 1962497 A1 | 8/2008 |
| IE | 20070821 A2 | 9/2008 |
| JP | 2002-49912 A | 2/2002 |
| JP | 2007-082026 A | 3/2007 |
| JP | 2008-040710 A | 2/2008 |

OTHER PUBLICATIONS

Japanese Office Action dated Nov. 30, 2010 (and English translation thereof) in counterpart Japanese Application No. 2008-316602.
Extended European Search Report dated Apr. 27, 2010 (in English) in counterpart European Application No. EP 09178005.

* cited by examiner

*Primary Examiner* — Sinh Tran
*Assistant Examiner* — Paul Berardesca
(74) *Attorney, Agent, or Firm* — Holtz, Holtz, Goodman & Chick, PC (57) ABSTRACT

In an image capture mode of a camera, a face area is detected from each of live-view images of a subject captured periodically (step S2). Information on the detected face area is stored in a detection result storage area (131) (step S4). When a shutter button is fully depressed (YES in step S5), a full-size image is acquired (step S6). Then, it is determined whether face area information is stored in the area 131 (step S7). If so (YES in step S7), information on an angle through which the camera is rotated to obtain a face area with the highest selection priority is selected from the face area information stored (step S8). Then, the face area detecting process is performed on the full-size image, using characteristic data on the face area involving the selected angle information (step S9).

11 Claims, 5 Drawing Sheets

−90 DEGREES　　　0 DEGREES　　　+90 DEGREES

IMAGE CAPTURING APPARATUS, FACE AREA DETECTING METHOD AND PROGRAM RECORDING MEDIUM

CROSS-REFERENCE TO A RELATED APPLICATION

This application is based on Japanese Patent Application No. 2008-316602 filed on Dec. 12, 2008 including specification, claims, drawings and summary. The disclosure of the above Japanese patent application is incorporated herein by reference in its entirety.

BACKGROUND OF THE INVENTION

1. Field of the Invention

The present invention relates to image capturing apparatus, face area detecting method and program recording medium.

2. Description of the Related Art

It is known to recognize a face part of a captured person image, and performs a predetermined process on the face part. For example, JP 2002-49912, pages 5-6, FIGS. 6-7, discloses an image capturing system for comparing each of successively inputted captured images with a captured image subjected to a predetermined image processing process; extracting a skin color area from the former image if there is no great difference between both the images: extracting a face part from the skin color area; and performing a predetermined image processing process on a predetermined area of the extracted face part including its eye parts so that the processed face image cannot be discriminated by others.

This system requires to perform the face detecting and image processing processes successively on the successively inputted images, which is a considerably large burden thereon. It is supposed that the system is installed permanently at a location so as to capture an image with a predetermined angle of view. Thus, if a function such as that of this system is included in an image capturing apparatus in hand, the detecting speed and accuracy of the face area can be influenced adversely by changes in the angle of view due to possible inclination of the camera body.

SUMMARY OF THE INVENTION

It is therefore an object of the present invention to provide an image capturing apparatus in hand capable of well detecting a face area of an image captured thereby.

In order to achieve the above object, one aspect of the present invention is to provide an image capturing apparatus comprising: an image capturing unit; an image generator for generating, from a first image captured by the image capturing unit, an image whose number of pixels is reduced compared to the first image; a face area detector for detecting a person's face area from the image generated by the image generator; a memory for storing information on the face area detected by the face area detector; and a face area detection controller for controlling the face area detector based on the information on the face area stored in the memory so as to detect a face area from a second image was captured by the image capturing unit after the information had been stored in the memory.

In order to achieve the above object, another aspect of the present invention is to provide an image capturing method comprising: capturing a first image; generating, from the first image, an image whose number of pixels is reduced compared to the first image; detecting a person's face area from the image; storing information on the detected person's face area; capturing a second image; and detecting a face area from the second image to based on the stored information on the detected person's face area.

In order to achieve the above object, a further aspect of the present invention is to provide a software program embodied in a computer readable medium for performing the image capturing method.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
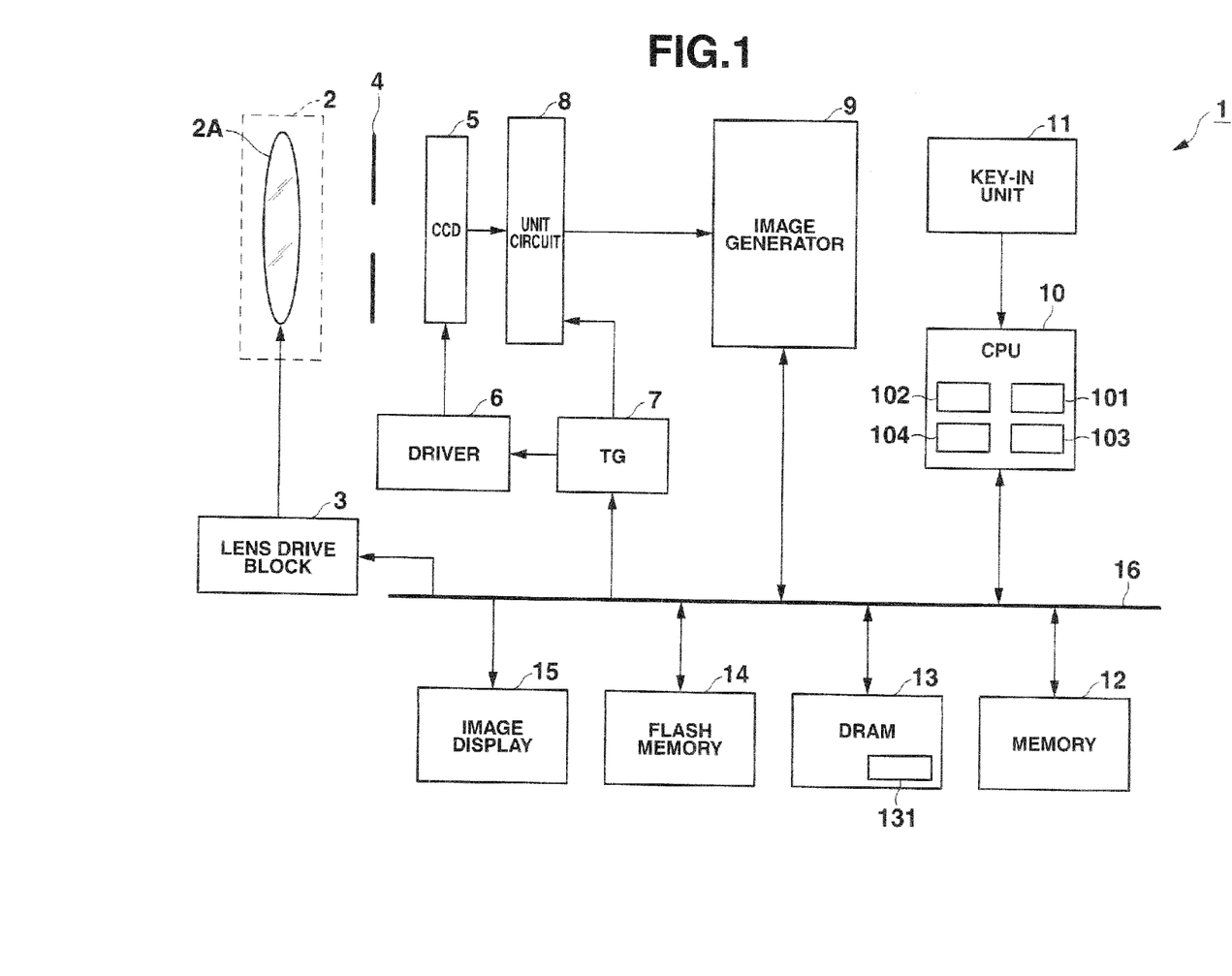
FIG. 1 is a block diagram of a digital camera according to one embodiment of the present invention.

Referring to the accompanying drawings, one embodiment of the present invention will be described. As shown in FIG. 1, a digital camera 1 according to the present invention includes an image capture lens unit 2, a lens drive block 3, a stop 4, a CCD 5, a driver 6, a timing generator (TG) 7, a unit circuit 8, an image generator 9, a CPU 10, a key-in unit 11, a memory 12, a DRAM 13, a flash memory 14, an image display 15 and a bus 16.

The image capture lens unit 2 is composed of a plurality of lenses (not shown), including a focus lens 2A, connected to the lens drive block 3. The lens drive block 3 includes a focus motor (not shown) which drives the focus lens 2A along an optical axis of the lens unit 2, and a focus motor driver (not shown) which drives the focus motor in accordance with a control signal from the CPU 10.

The CCD 5 is driven by the driver 6 to periodically convert the respective intensities of light components of R, G and B values from a captured subject image to an image signal and output it to the unit circuit 8. The operational timing of the driver 6 and unit circuit 8 is controlled by the CPU 10 through the timing generator 7. The CCD 5 has a Bayer array of color filters and also functions as an electronic shutter whose speed is controlled by the CPU 10 through the driver 6 and the timing generator 7.

An image (signal) whose number of pixels is substantially the same as that of image detection elements of the CCD 5 is hereinafter referred to as a full-size image or signal. As also will be described in detail later, an image (signal) displayable on the image display 15 is low in resolution compared to the image in order to increase the updating speed thereof and hereinafter referred to as a live-view image (signal). The live-view image signal is obtained by using the image generator 9 to reduce the number of pixels of an image signal output from an A/D converter of the unit circuit 8 and stored in a buffer memory area of the DRAM 13.

The unit circuit 8, connected to the timing generator 7, includes a CDS (Correlated Double Sampling) circuit which performs a CDS operation on an image signal from the CCD 5 and holds a resulting sampled signal, an AGC (Automatic Gain Control) circuit which automatically adjust the gain of the sampled signal, and the A/D converter which converts an analog signal from the AGC circuit to a digital signal. This digital signal is then delivered to the image generator 9 through the unit circuit 8.

The image generator 9 performs a γ-correcting process and a white balancing process on the image data received from the unit circuit 8, produces a luminance/color difference signal (or YUV data), temporarily stores this signal in the buffer memory area of the DRAM 13, and then produces the live-view image and the full-size image from the stored image signal.

In accordance with a command from the CPU 10, the image generator 9 performs a predetermined image processing process on detected face areas in the full-size image; i.e. the image processing including, for example, a decongesting process which relieves the congestion of eyes of each face image, a process for improving the complexion of the skin, and a process for lifting up the cheeks of the face image, and a process for removing a red-eye state appearing when strobe light is emitted. These facial treatments are well known and further description thereof will be omitted.

The CPU 10 comprises a one-chip microcomputer which performs an image capturing control process over the CCD 5, a process for compressing the full-size image data stored in the buffer memory area of the DRAM 13 and then recording the resulting data on the flash memory 14, a process for displaying the live-view image stored in the buffer memory area, and a process for controlling respective associated elements of the camera 1.

Especially, the CPU 10 causes the timing generator 7 to drive the CCD 5 periodically, thereby obtaining a plurality of image data. The CPU 10 includes a first image capture controller 101 which outputs to the DRAM 13 the plurality of image data to produce a like number of live-view images; a second image capture controller 102 which responds to a still image record command issued by full depression of a shutter button (not shown), which will be described later, to perform a still image processing process for recording purpose, and which then stores a resulting full-size image temporarily on the DRAM 13.

The CPU 10 also includes a face area detector 103 which detects respective face areas present in each of the live-view image and the full-size image and stores information on the detected face areas (including camera rotation angle, position and size) in a detection result storage area 131 of the DRAM 13; and a face area detection controller 104 which controls the face area detector 103 so as to detect face areas from the full-size image data based on information on the face areas stored in the detection result storage area 131.

The face area detector 103 prestores, as comparison standards, characteristic data of a face area of a general person image, such as eyes, eyebrows, nose, mouth, ears and the configuration of the whole face captured by the camera at each of its rotation angles of −90, 0 and +90 degrees, in correspondence to these respective rotation angles. The face area detector 103 performs a face area detecting process which includes comparing the characteristic data of the comparison standards with newly acquired live-view image data to detect face area(s) contained in the live-view image each of which face area has characteristic data matching those of a respective one of face areas of the live-view image to a predetermined matching degree, for example, of 80% or more.

When the face area detector 103 detects the face area(s) from the live-view image, the CPU 103 stores, in the detection result storage area 131, information on the detected camera rotation angle, position and size of each of the detected face area(s). If more than one face are detected from the live-view image, the information on these face areas detected in a similar manner may be stored in correspondence to the full-size image data. The detected face area information may be stored in correspondence to image data of the full-size image.

Figure 2:
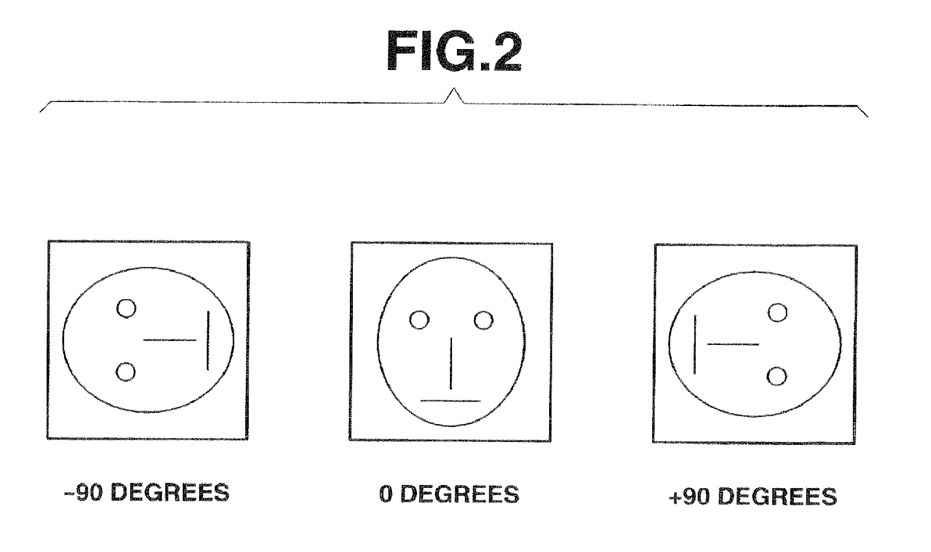
FIG. 2 schematically illustrates characteristic data of face areas of images of a subject captured at three different camera rotation angles prestored in a memory.

The reason why the face area detector 103 prestores the characteristic data of the images captured respectively at the three camera rotation angles of −90, 0 and +90 degrees, as shown in FIG. 2, is that it is assumed to detect face area(s) from an image captured in each of a general horizontally oriented image capture angle of view and a vertically oriented image capture angle of view such as used in portrait capture.

The face area detection controller 104 controls the face area detector 103 based on data on each face area in the live-view image stored in the detection result storage area 131 to detect a face area in the full-size image. If, for example, −90 degree camera-rotation angle information is contained in the detected face area information of the live-view image, the face area detection controller 104 controls the face area detector 103 so as to detect a face area in the full size image, using the face area characteristic data of the comparison standards obtained at the −90 degree camera-rotation angle, as required.

The key-in unit 11 includes the shutter button, a mode key, a cruciform key, a set key, a cancel key, etc., each of which is not shown and when operated, sends a corresponding operation signal to the CPU 10.

The memory 12 prestores required data and a control program required for the CPU 10 to control the respective associated elements of the camera.

As will be obvious from the above, the DRAM 13 comprises the buffer memory area (not, shown) which temporarily stores image data capture by the CCD 5 and received from the CPU 10, a working memory area (not shown) for the CPU 10, and the detection result storage area 131 which stores information on the camera rotation (or image capture) angle, position and size of each face area in the live-view image received from the face area detector 103.

The flash memory 14 is a recording medium which stores compressed full-size images.

The image display 15 comprises a color LCD and its driver. In a standby state, the image display 15 sequentially displays live-view images produced periodically by the image generator 9. In the reproduction of a recorded image, the display 15 displays a full-size image read from the flash memory 14 in a reduced size.

Figure 3:
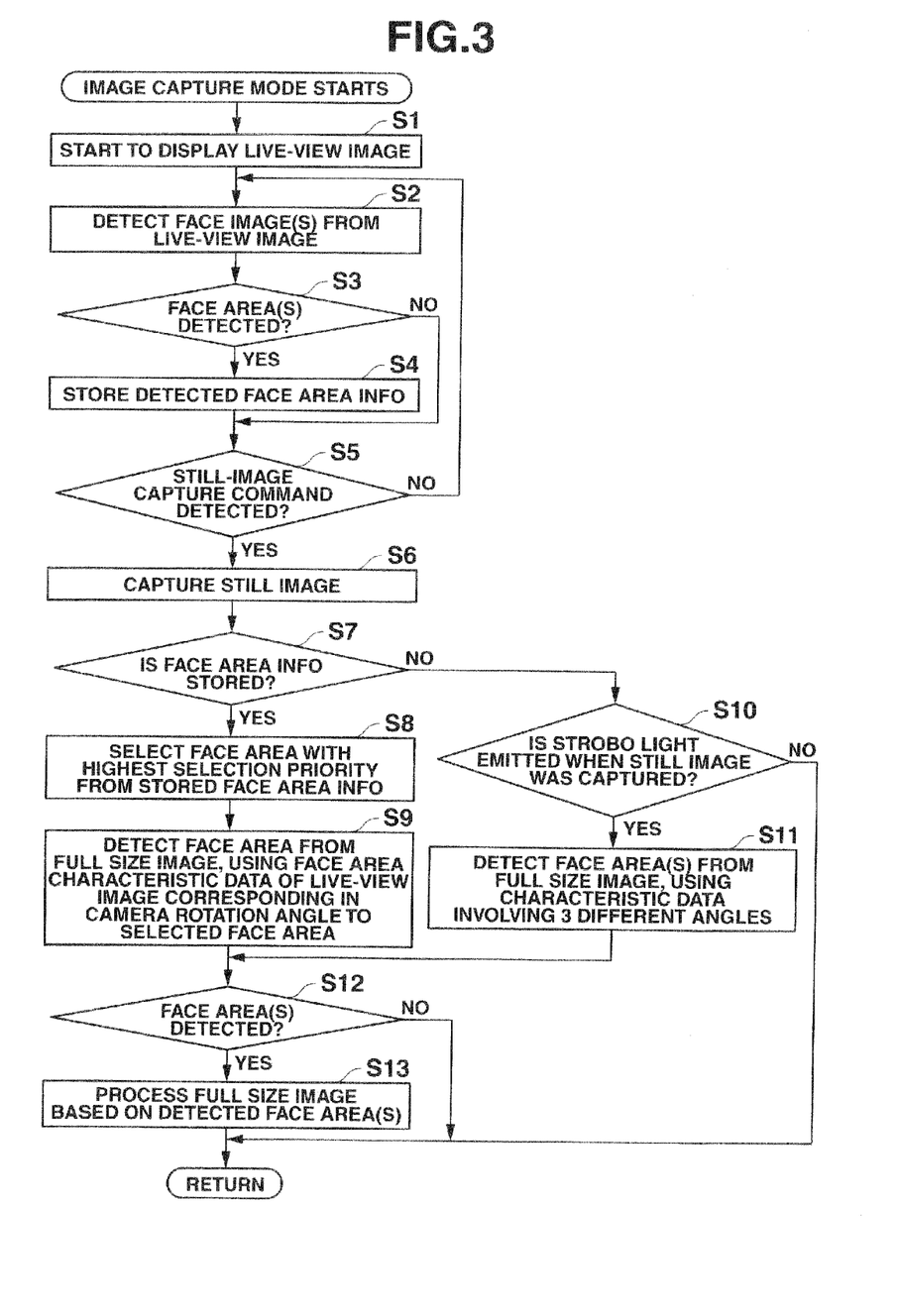
FIG. 3 is a flowchart of operation of the digital camera.

In operation, as shown in the flowchart of FIG. 3, when the user sets an image capture mode by operating the mode key, the first image capture controller 101 causes the CCD 5 to capture images of a subject sequentially at a predetermined frame rate. Then, the controller 101 stores frame image (or YUV) data of a luminance/color difference signal, sequentially generated by the image generator 9 based on the image signals sequentially outputted by the CCD 5, in the buffer memory area the DRAM 13. The first image capture controller 101 reduces a predetermined number of pixels from each of frame image data stored in the DREAM 13 to produce a live-view and displays it on the display 15 (step S1).

Then, the face area detector 103 of the CPU 10 performs the face area detecting, process on the live-view image. At this time, the face area detector 103 checks if there are in the whole area of the captured live-view image or within the whole angle of view a person face area(s) each of which characteristic data match those of the face area image(s) of the comparison standards captured at respective ones of the camera rotation angles of 90, 0 and +90 degrees as shown in FIG. 2 to a predetermined matching degree, for example, of 80% or more (step S2).

Figure 4A:
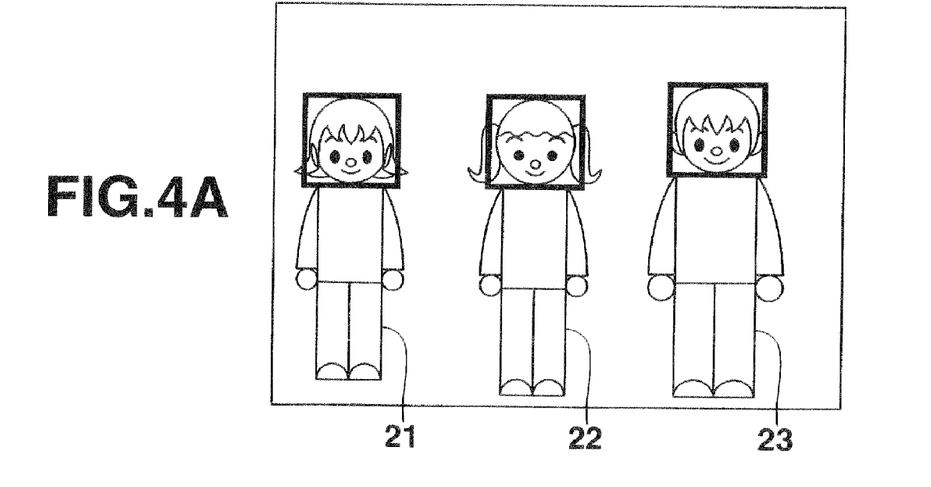
FIGS. 4A and B illustrate a live image including three person images each with a detection frame on its face area.
Figure 4B:
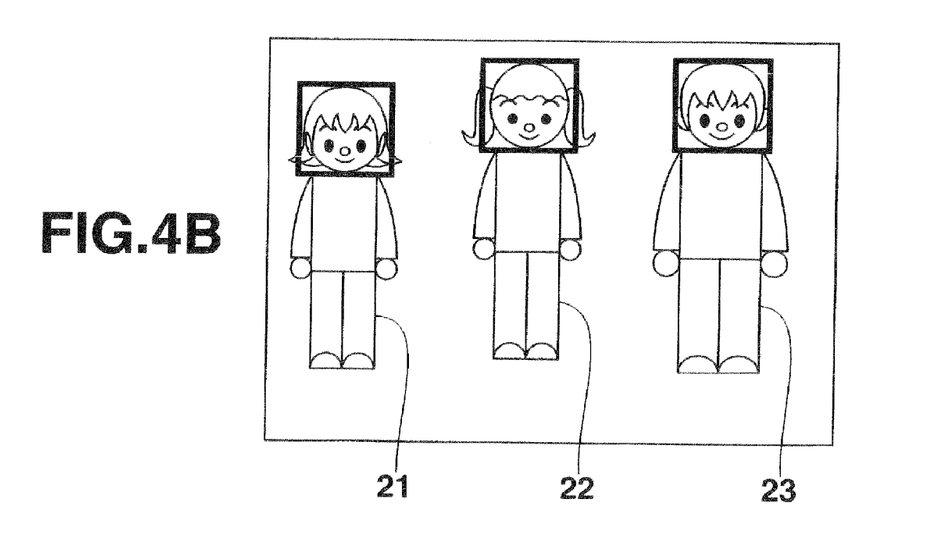

FIG. 4A illustrates one example of a displayed live-view image including three subject images 21, 22 and 23 each with a face detection frame over its face area, which indicates that each face area is detected. FIG. 4B illustrates a live-view image similar to FIG. 4A displayed directly before that of FIG. 4A.

Then, the CPU 10 determines whether a face area(s) have been detected in step S2 (step S3). If so, the CPU 10 goes to step S1. Otherwise, the CPU 10 goes to step S5.

In step S4, the face image detector 103 of the CPU 10 stores information on each of the detected face area(s) in the detection result storage area 131, thereby updating the area 131. The detected face area information involves the camera rotation for image capture) angle, position and size of each detected face area in the live-view image.

The update of the detection result storage area 131 is performed in such a manner that when the storage area 131 is full of items of face area information detected sequentially from the live-view images and a next new item of face area information is received, the oldest item of face area information is deleted and then the new item of face area information is stored instead in the area 131. Thus, the area 131 stores the latest predetermined number of items of face area information.

The rotation angle of the camera at which each of the subject images 21, 22 and 23 of FIG. 4A has been captured is 0. Thus, information on the camera rotation angle of 0 degrees is stored in the area 131 in association with the position and size data of the detected face area.

It is assumed that the face area information on the three subject images detected from each of the live-view images of FIGS. 4A and B has been stored in the area 131.

Then, the CPU 10 determines whether a signal indicative of a still image capture command generated by the full depression of the shutter button has been received (step S5).

If not (in step S5), the CPU 10 returns to step S2. Thus, the face area detecting process is performed on each of the live-view images captured sequentially by the CCD 5 such that the detection result storage area 131 is updated so as to store information on the latest predetermined number of face areas. The operation in steps S2-S5 shall be terminated by the time a next frame image data is captured.

When the CPU 10 determines in step S5 that a still image capture command is received, the second image capture controller 102 performs a still image capturing process to store a resulting full-size image temporarily in the buffer memory (step S6).

Then, the CPU 10 determines whether the detected face area information is stored in the detection result storage area 131 (step S7). More particularly, the CPU 10 determines whether face areas detected from the respective live-view images captured successively for the predetermined time before the shutter button is fully depressed are stored in the area 131.

If so (YES in step S7), the CPU 10 selects information on a face area with the highest selection priority from among the face area information stored in the area 131 based en the positions and sizes of the face areas of the live-view images stored in the area 131 in correspondence to the respective camera rotation angles (step S8). The selection priority of the detected face area information is higher as it is closer to the center of the view of angle and greater size.

As described above, the face area information stored in the area 131 involves the subject images 21, 22 and 23 detected from the live-view images of FIGS. 4A and B. There are no differences in size between the detected face areas of FIG. 4A and B, but the face area of the subject image 22 of FIG. 4A is nearest the center of the view of angle and selected as such with the highest selection priority.

Then, the face area detection controller 104 of the CPU 10 detects a face area(s) from the full-size image. At this time, the face area detection controller 104 controls the face area detector 103 based on the camera rotation angle involving the capture of the face area selected in step S8 to perform the face area detecting process (step S9). The face area selected in step S8 is obtained at the image capture angle of 0 degrees, which means that the camera rotation angle of 0 degrees is selected.

Thus, the face detection controller 104 controls the face area detector 103 so as to detect the face area from the full-size image, using only the face characteristic data captured at, the rotational angle of 0 degrees.

While the face area detecting process is illustrated as performed on the live-view image, using the characteristic data of the comparison standards involving the three different camera rotation (or image capture) angles (−90, 0 and +90 degrees), the face area detecting process to be performed on the full-size image uses the characteristic data of the live-view image face area obtained at the same camera rotation angle as involves the capture of the face area with the highest selection priority selected from among the face areas detected from the live-view image.

Then, the CPU 10 determines whether a face area(s) have been detected from the full-size image (step S12). If so, the CPU goes to step S13.

Upon determining that no detected face area information is stored in the detection result area 131 NO in step S7), then the CPU 10 determines whether strobe light has been emitted in the still image capturing process (step S10). A person's image cannot be materially captured in a dark place unless strobe light is emitted. Thus, in this embodiment, use of the strobe light in the image capturing process means regarding any person image(s) as contained in the obtained captured image. A strobe light (not shown) may be built in the camera 1 or connected to the camera 1.

Upon determining that strobe light has been emitted (YES in step S10), the CPU 10 performs the face area detecting process on the full size image using the characteristic data of the respective face areas of the comparison standards involving the three camera rotation angles of −90, 0 and +90 degrees (step S11).

Upon determining that no strobe light is emitted in the dark place in step S10, the CPU 10 does not perform the face area detecting process by regarding the captured full-size image as containing no person images.

Then, the CPU 10 determines whether a face area(s) have been detected from the full-size image in step S12. If so, the CPU 10 causes the image generator 9 to perform a predetermined image processing process on the detected face area(s) in the full-size image, including the decongesting process, the skin enhancement process, the complexion improving process, the tooth whitening process, the eye opening process, the cheek lifting-up process, and the red eye removing process, thereby producing a new image.

Then, the CPU 10 stores this image(s) on the flash memory 14 (step S13) and returns to step S1. If not in steps S10 and S12, the CPU 10 compresses the captured full-size image data, stores it on the flash memory 14, and then returns to step S1. When another mode is set by the operation of the mode key in the image capture mode, then the CPU 10 terminates the image capture mode.

As described above, in this embodiment, when the face area information detected from the latest predetermined number of live-view images obtained before the still image capture command is issued is stored in the detection result storage area 131, the face area detecting process is performed based on the face area information stored in that area. This reduces the time and load required for performing the face area detecting process on the full-size image, thereby achieving a good face area detecting process.

When information on the plurality of face areas is stored in the area 131, the face area detecting process is performed on the full-size image, using the characteristic data of the comparison standards obtained at the same camera rotation angle as involves the capture of the face area with the highest selection priority. Thus, even when unnecessary face areas are contained in the full-size image, the time and load required to perform the face area detecting process is reduced.

Even if no face area(s) are detected from the live-view image, and when the strobe light, has been emitted to capture a still image, detection of a face area(s) from the full-size image obtained in the still picture capturing process is tried, using characteristic data of the face areas of the comparison standards obtained at the plurality of camera rotation angles.

Thus, even if no satisfactory face areas can be detected from the live-view images due to insufficient quantity of light in its environment such as in a night landscape image capturing operation, a reliable face area detecting process is performed on the full-sized image.

If neither a face area(s) are detected from the live-view image nor strobe light is emitted in the still image capturing process, the CPU 10 determines that the captured image contains no face areas, and then records the full-size image, which prevents unnecessary face image detecting process from being performed.

(Modification)

As described above, when it is determined in step S7 in the above embodiment that the face area information is recorded, the camera rotation angle of capture of the face area with the highest selection priority is selected from the stored face area data.

Figure 5:
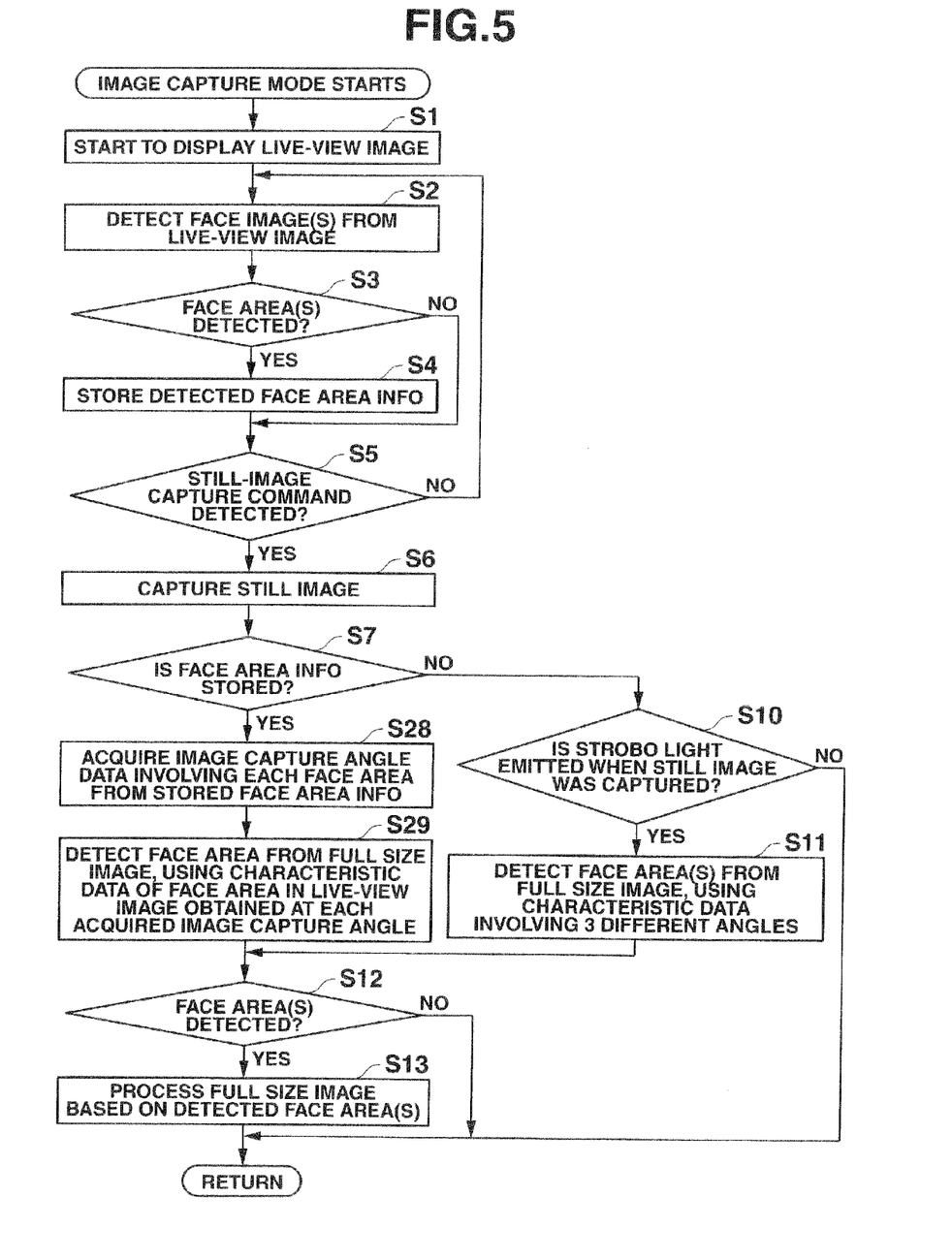
FIG. 5 is a modification of flowchart of FIG. 3.

(01) In contrast, as shown in a flowchart of FIG. 5, which is a modification of the flowchart of FIG. 3, arrangement may be such that when it is determined in step S7 that the face area information is stored in the detection result storage area 131, camera rotation angle information on each of the stored face areas is acquired from the storage area (step S28), and then the face area detecting process is performed on the full-size image, using characteristic data on each of the face area(s) in the live-view image obtained at that acquired camera rotation angle (step S29). Thus, even when the full-size image contains a plurality of face areas captured at corresponding different camera rotation angles, all the face areas are detected.

(02) While in the embodiment the camera rotation angle involving the capture of the face area is illustrated as selected from the face area information detected from the latest live-view images stored for the predetermined time before the still image capture command is issued, the camera rotation angle may be selected from the information on the face area detected from the live-view image captured immediately before the still image capture command is issued.

Alternatively, information on a face area with the highest selection priority may be selected from the information on the face area(s) detected from the respective live-view images stored for the predetermined time before the still image capture command is issued.

(03) While in the embodiment the selection priority of the face area information is illustrated as determined depending on the size of the face area and its distance from the center of the angle of view, it may be determined depending on other factors.

For example, a memory which stores the face image(s) of one or more persons may be provided such that the selection priority of the face area data to be used in the face area detecting process is determined depending on whether the face area of a specified person image stored in the memory is detected from a live-view image. Alternatively, the selection priority of the face area data may be determined depending on the number of times the face area of the specified person image has been used so far for detecting purpose.

(04) The face area may be detected from the full-size image in accordance with at least one of the camera rotation angle, position and size of each of the face areas stored.

(05) When in the embodiment no face area(s) are detected from the full-size image (NO in step S12 in FIG. 3), the image processing process is illustrated as not performed. On the other hand, if the face area information is stored (YES in step S7 in FIG. 3) and no face area(s) are detected from the full-size image NO in step S12 in FIG. 3), the face area information stored may be used as the face area information on the full-size image.

When a face area(s) are detected from the live-view image obtained immediately before a still image is captured and no face area(s) are detected from the full-size image, information on the face area(s) detected from the live-view image obtained immediately before the still image is captured may be handled as information on the face area(s) detected from the full-size image.

(06) While in the embodiment the face area characteristic data of the comparison standards involving the three different camera rotation angles of −90, 0 and +90 degrees are used to detect the face area(s) from the live-view image, more different camera rotation angle characteristic data may be used for the face area detecting purpose.

(07) Alternatively, the face area detecting process may be performed on the live-view image, using characteristic data corresponding to the (upward, downward, leftward, or rightward) direction of a face image other than the angles. The face area detecting process to be performed on the full-size image may use characteristic data on the direction of the face area detected from the live-view image.

(08) Any combinations of the modifications 01-06 may be used.

(09) While in the embodiment and modifications, application of the image capturing apparatus according to the present invention to the digital cameras is illustrated, the present invention is not limited to the above embodiment and modifications, but applicable to any devices capable of capturing images of subjects and detecting the subjects.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An image capturing apparatus comprising:
an image capturing unit;
an image generator for generating, from a first image captured by the image capturing unit, a reduced image whose number of pixels is reduced compared to the first image;
a memory for storing face information that comprises face area characteristics at a plurality of different angles;

a face area detector for detecting a person's face area from the reduced image generated by the image generator and storing angle information of the detected face area, based on the face information stored in the memory; and a face area detection controller for controlling the face area detector based on the stored angle information so as to detect a face area from a second image captured by the image capturing unit after the storing of the angle information by the face area detector.

2. The image capturing apparatus of claim 1, wherein the image capturing unit comprises:

a first image capture controller for capturing first images periodically; and a second image capture controller for capturing the second image for recording; and wherein:

the image generator sequentially generates reduced images from the first images captured periodically by the first image capture controller;

the face area detector sequentially detects a person's face area from the sequentially generated reduced images and stores angle information of the detected face area based on the face information stored in the memory; and the face area detection controller controls the face area detector so as to detect a face area from the second image based on the stored angle information.

3. The image capturing apparatus of claim 2, wherein the face area detection controller controls the face area detector so as to detect a face area from the second image based on angle information that had been stored immediately before the second image was captured.

4. The image capturing apparatus of claim 3, further comprising first determining means for, responsive to detection of an image capture command, determining whether angle information of a detected face area has been stored;

wherein the face area detection controller controls the face area detector so as to detect a face area from the second image in response to the first determining means determining that the angle information has been stored.

5. The image capturing apparatus of claim 4, further comprising second determining means for, responsive to the first determining means determining that no angle information on a detected face area has been stored, determining whether strobe light was emitted when the second image was captured;

wherein the face area detection controller controls the face area detector so as to detect a face area from the second image in response to the second determining means determining that strobe light was emitted.

6. The image capturing apparatus of claim 1, wherein when the face area detector detects a plurality of face areas from the reduced image, the face area detector stores respective angle information of the plurality of detected face areas, and the face area detection controller controls the face area detector so as to detect a plurality of face areas from the second image based on the stored respective angle information of the plurality of detected face areas.

7. The image capturing apparatus of claim 1, further comprising selecting means for, in a case in which the face area detector detects a plurality of face areas from the reduced image, selecting a face area based on at least one of a distance of the detected face areas from a center of an angle of view of the image and sizes of the detected face areas;

wherein the face area detection controller controls the face area detector based on the stored angle information of the selected face area so as to detect a face area from the second image.

8. An image capturing method for an image capturing apparatus that comprises a memory storing face information that comprises face area characteristics at a plurality of different angles, the method comprising:

capturing a first image using an image capturing unit of the image capturing apparatus;

generating, from the first image, a reduced image whose number of pixels is reduced compared to the first image;

detecting a person's face area from the reduced image and storing angle information of the detected face area, based on the face information stored in the memory;

capturing a second image; and detecting a face area from the second image based on the stored angle information of the person's face area detected from the first image.

9. A non-transitory computer readable medium that is executable by a computer of an image capturing apparatus that comprises a memory storing face information that comprises face area characteristics at a plurality of different angles, to perform the method of claim 8.

10. The image capturing apparatus of claim 1, wherein the angle information indicates a relative angle between the detected face area and the image capturing apparatus.

11. The image capturing apparatus of claim 1, wherein the face information comprises face area characteristics of faces that are at a plurality of different angles with respect to the image capturing apparatus.

* * * * *